United States Patent Office 3,272,602
Patented Sept. 13, 1966

3,272,602
METHOD OF PRODUCING URANIUM DIOXIDE POWDER
Yoshiyuki Suehiro, 2–212 Moto-machi, Urawa-shi, Saitama-ken, Japan; Akio Takashima and Takashi Suzuki, both of 1–190 Kitabukuro-machi, Omiya-shi, Saitama-ken, Japan; and Hidekazu Doi, 359 Oaza-Sakawa, Urawa-shi, Saitama-ken, Japan
No Drawing. Filed Dec. 9, 1960, Ser. No. 74,749
4 Claims. (Cl. 23—354)

This invention relates to a method of producing pulverized uranium dioxide having uniformity of quality, high density, and high degree of packing characteristic. Said uranium dioxides are suitable for such purposes as raw materials for nuclear fuels fabricated particularly by swaging, pelletization, and extrusion, etc.

In the conventional methods known heretofore, wherein ammonium diuranate (hereinafter referred to as ADU) is precipitated from an aqueous solution of uranyl salt and decomposed by heat to produce $UO_3$ or $U_3O_8$, which are then hydrogen-reduced to produce $UO_2$, it has been considered that, as the precipitation process conditions, a concentration of uranium of 100 to 200 grams per litre and a concentration of ammonia of 28% in the solution; a reaction temperature of 60° C.; end-point pH of 9 to 9.3; and precipitation time of within one hour are suitable,[1] and ADU has been generally considered as an amorphous, cohesive precipitate. The ADU thus obtained becomes, depending on the thermal decomposition temperature, $UO_3$ at 500 to 600° C. or lower, and $U_3O_8$ at 500 to 600° C. or higher. The grain size of the $U_3O_8$ is larger than that of the $UO_3$. By the method known in the art, the oxide thus obtained is reduced by hydrogen at 700 to 1,000° C., cooled in a neutral atmosphere such as nitrogen or carbon dioxide gas, then made into $UO_2$ power. However, the $UO_2$ powder (for sintering) obtained is composed of aggregates of minute and active particles whose average particle diameter is said to be 0.05 to 2 microns, and although a sintered density of 93 to 97% is obtained when said particles are sintered as pellets, reaction with the oxygen in the air occurs during storage, and the atomic ratio O/U between the oxygen and the uranium changes to 2.05–2.20 or higher with respect to 2.000 for $UO_2$. Consequently, it is difficult to maintain uniformity of quality. During the above process, the average particle size of the $UO_2$ particles obtained through $U_3O_8$ is larger than that of the particles obtained through $UO_3$.[2]

In order to supply the $UO_2$ powder obtained in the above-outlined manner to the fuel of a nuclear reactor, it is necessary to process the said powder further.

The process steps in connection with swaging and pelletization for making nuclear fuel may be outlined as follows. Swaged fuel may be defined as a fuel element of high density which has been fabricated mechanically after $UO_2$ powder or a mixture of $UO_2$ powder and other powders have been packed into a metallic sheath. A correlation between the specific gravity of the product after fabrication and the packing characteristic of the raw material powder has been determined. The particles of $UO_2$ powder have high specific gravity,[3] and the higher their packing characteristic, the better they are in quality. In order to place the $UO_2$ obtained in the afore-described manner in a state which is suitable for swaging, the following processes have been devised.

(1) The $UO_2$ powder is molted by means of an electric arc, then pulverized.

(2) A lubricant, binder, etc., are added to the $UO_2$ powder, which is then granulated, compacted by pressing, sintered at 1,600° to 1,650° C. in hydrogen, then pulverized.

(3) Titanium oxide and other additives for promoting sintering are added to the $UO_2$ powder, which is then sintered at 1,650° to 1,750° C. in hydrogen to cause grain growth.

Of these processes, (1) and (2) are reported to have produced powders of maximum tapped density of 67.5%,[3] and powders of tapped density of 66.4 to 63.6%, produced by the process (1), are on the commercial market.[4] It is also reported that by the process (3), powders of grain size of the order of 40 to 80 microns are obtained. However, this requires the addition of impurities other than uranium, and, moreover, the tapped density of the powder obtained is 60% or less. In all cases, the process steps of these methods are complex, or the product quality is deficient.

A pellet may be defined as a principal unit of fuel element of high specific gravity which has been produced by adding a binder and a lubricant to $UO_2$ powder obtained as afore-described– granulating the said powder; compacting the same into a circular cylinder or other form; and sintering the same at 1,500° to 1,750° C. in an environment of hydrogen, hydrogen containing water vapor, an inactive atmosphere, vacuum, or a combination thereof. In general, a sintered material density of the pellet of 93% or higher is required.

The $UO_2$ powder obtained by hydrogen reduction at 700° to 1,000° C. according to the afore-mentioned, conventional method is for producing this pellet and has the aforementioned deficiency in uniformity of quality. Moreover, during sintering of said $UO_2$, a shrinkage of the order of 18 to 22% occurs and the pellet which should be of the form of a circular cylinder shows so-called hour glassing, and the dimensional accuracy in the radial direction of the sintered material in the case of pellet of 7 to 10 millimetre diameter becomes of the order of ±3/100 millimetres, in which condition, the pellet is unsuitable for the purpose of nuclear fuel. For this reason, a process step wherein the sintered material is finished by means of a centerless grinder becomes necessary. However, this process step entails a large part of the production cost of the pellets together with the problem of disposing of scrap $UO_2$ which is formed.

For the production of pellets whose dimensional accuracy is excellent and which do not require a finish grinding process step, a powder having an excellent sintering characteristic while having as high a density as possible (green compact density) at the time of pressing, moreover having a small shrinkage due to sintering is necessary

---

[1] CRCE–716, W. T. Bourns and others, "Preparation of Uranium Dioxide for Use in Ceramic Fuels" (Sept. 19, 1958).
[2] F. R. Bruce and others: "Progress in Nuclear Energy, Series III," Process Chemistry, vol. I, p. 19 (1956).

[3] A/conf. 15/p/192, G. H. Chalder and others, "The Fabrication and Properties of Uranium Dioxide Fuel."
[4] Nucleonics, 17, No. 9, 41 (1959), Spencer Chem. Co.

as a raw material. However, a correlation between the green compact density and the sintered material density has been recognized, according to which, the higher the green compact density is, the poorer is the sintering characteristic. In order to obtain a sintered material density of 93% or higher, a green compact density of 6 to 6.2 grams/cubic centimetre or less is desirable.[3]

It is the principal object of the present invention to provide a relatively simple method of producing pulverized uranium dioxide suitable for such purposes as making nuclear fuel elements and having homogeneity, high particle density, and high tapped density.

It is another object of the invention to provide a method of producing pulverized uranium dioxide of the above-described properties, which does not have the disadvantages of the conventional methods of the same kind.

According to this invention, the special precipitation conditions for ADU and the special conditions of reduction and sintering of uranium trioxide or triuranium octoxide were used conjointly, whereby it was possible to produce uranium dioxide powder of excellent properties, that is, uniform quality, high particle density, and high and easy packing characteristic, for its use for swaging, pelletization, and other fabrication methods. In more specific terms, by the practice of the present invention, the uranium dioxide powder obtainable has an average particle size (diameter) of from 2 to 150 microns; is of uniform quality; and is a stable powder of 98% or higher particle density. The pulverized material, for use in swaging purpose, has a maximum tapped density of 75%, and a density after fabrication of 92% or higher can be easily obtained. The said pulverized material, for use in pelletization, has an excellent sintering characteristic in spite of its good packing characteristic and its green compact density of the order as high as 7.2 grams/cubic centimetre or more. Pellets wherein the sintered material density after hydrogen sintering at 1,600° C. is 95±2%, the shrinkage is 12% or less, and the dimensional accuracy in the radial direction is within ±1/100 millimetre are obtained.

In the production method of the present invention, it is necessary for the ADU precipitation process to produce a precipitate of large unit crystals of ADU, having weak aggregating character and, moreover, excellent filtering quality. This condition differs from that of the case of the conventional method wherein $UO_2$ powder for sintering is sought. More specifically, the following conditions have been found to be suitable as precipitation conditions: an uranium concentration in the aqueous solution of uranyl salt is 100 grams/litre or less; a concentration of ammonia for precipitation is 28% or less; a rate of adding ammonia is 200 grams of $NH_3$ per kilogram of U per minute or less; a reaction temperature is 100° C. or lower; and an end point pH value is sufficient to complete uranium precipitation reaction, for instance 6 to 7. These conditions, particularly that of an uranium concentration of 100 grams/litre or less, clearly differentiate the present method from other methods known in the art.

The ADU obtainable from one embodiment of the invention is in the form of thin flakes of approximately 0.5 micron when the pH value is 4 to 6. When the pH value becomes high, the ADU obtained becomes an aggregate material, with which a characteristic X-ray diffraction pattern is obtainable. The formation of a precipitate of such crystalline characteristic can be promoted by leaving a portion of the ADU formed always in the solution. The ADU obtainable under these conditions can be easily filtered and washed. The dried product can also be easily pulverized.

The ADU produced in the above-described manner is next thermally decomposed. That is, when this product is heated to 300° C. or higher, it thermally decomposes into oxides and on the low temperature side of a temperature borderline of 500 to 600° C., $UO_3$ crystals of 0.01 to 0.5 micron size, which clearly exhibit a X-ray diffraction pattern, are formed. On the high temperature side, in the range of 600 to 900° C., $U_3O_8$ crystals of 0.1 to 5 micron size, which have pseudo-hexagonal crystalline form, are formed.

When these $UO_3$ and $U_3O_8$ are reduced in a current of hydrogen gas, grain growth due to sintering begins simultaneously in the neighborhood of 600° C. For example, $UO_3$ of 0.1 to 0.2 micron size and $U_3O_8$ of 0.4 to 0.5 micron size which have been obtained from the same ADU by thermal decomposition at 400° C. and 700° C., respectively, both grow to approximately equal particle size of 0.8 to 1 micron in the neighborhood of 1,100° C. When this temperature is exceeded, the particles from the $UO_3$ become larger in particle size than those from the $U_3O_8$, their particle size becoming approximately 50 microns at 1,500° C. and approximately 100 microns at 1,750° C.

During the development of the present invention, it was discovered from the said experimental results and other observations that, if $UO_3$ or $U_3O_8$ obtained from thermal decomposition as described above is reduced and sintered in a current of hydrogen gas at a temperature of 1,200 to 1,750° C., the result is extremely effective. In other terms, the accomplishing of reducing and sintering at this temperature is also a new, important requisite and feature of this invention. The term "current of hydrogen gas" used herein refers not only to the case of hydrogen alone but also to mixtures of hydrogen and nitrogen or it includes also gaseous flow of such substances as ammonia which dissociates hydrogen at the aforesaid temperature.

Thus, by the practice of the present invention, stable $UO_2$ of average particle size of 2 to 150 microns is obtainable, and it is possible to take it out into the air immediately after it has been cooled in a current of hydrogen gas. The O/U mol ratio of the product formed is 2.00. In appearance, the $UO_2$ powder obtained has a color ranging from brick red to reddish purple, and its state of cohesion is such that it can be loosened by pressing with a finger tip. The particle density of the product is 90% or higher, and when the powder which has been reduced and sintered at 1,400° C. is observed by means of an electron microscope, clear steps in grain growth and a sintering boundary are recognizable, and the structure is composed of dispersed particles which are homogeneous and smooth and have low cohesion. Furthermore, depending on the pulversizing conditions, it is possible to process this cohesive substance into a powder which has a maximum tapped density of 75% and excellent properties suitable for swaging, or into a powder which has sintered properties of green compact density of 7.2 grams/cubic centimetre or higher, sintered density of 95±2%, and a shrinking rate of 12% or less and excellent dimensional accuracy suitable for pelletizing.

By the practice of the present invention as described above, not only is it possible to obtain $UO_2$ substance which has extremely good homogeneity, high density, and excellent tapping quality as a nuclear material for nuclear reactors, but also it is possible to eliminate all such complicated process steps, which are necessary in the conventional methods, as first reducing $UO_3$ or $U_3O_8$ at 700 to 1,000° C. to $UO_2$, and further melting and pulverizing this $UO_2$, or promoting its sintering by mixing thereinto another substance.

The details of the invention will be understood more fully from a consideration of the following examples of embodiments thereof.

*Example 1*

40 litres of aqueous solution of uranyl nitrate having a uranium concentration of 25 grams/litre were poured into a stainless steel, reaction tank of 60 litre capacity having a propeller type agitator. Aqueous ammonia of 14% concentration at 20° to 30° C. was added to the said solution at an initial flow rate of 100 grams of NH₃/minute. This addition rate was adjusted in accordance with the rise in pH value. In approximately 2 hours, the pH value became 6.3. It was possible to filter the resulting precipitate in approximately 2 hours in a Büchner funnel made of vinyl chloride and having a diameter of approximately 60 centimetres. The filtered material was dried in a hot-air drier at 60° C. and pulverized. The powder obtained was then placed in a stainless steel tray and calcined for three hours at 400° C. in a muffle type high Ni—Cr stainless steel electric furnace in the current of air. The $UO_3$ thus obtained was placed in a tray made of molybdenum, which was then placed in a high temperature reducing furnace made of a high alumina furnace tube and a molybdenum resistance wire, whereby the $UO_3$ was heated to 1,500° C. in a current of purified and dried hydrogen gas and reduced and sintered for three hours. After that, the tray was moved to the cooling part at the end of the furnace, cooled to room temperature, and taken out into the atmospheric air. The substance thus obtained was $UO_2$ powder of reddish purple color which had a cohesion such that the material loosened when pressed with a finger tip. When this cohesive material was further ground in a mortar, a $UO_2$ powder suitable for swaging of tapped density of 72%, average particle size of approximately 100 microns and particle density of 99% was obtained.

*Example 2*

20 litres of aqueous solution of uranyl nitrate having a uranium concentration of 50 grams/litre was heated at 70° to 80° C. in a reaction tank similar to that used in Example 1, provided with a projection type stainless steel electric heater and reflux condenser, and then aqueous ammonia of 28% concentration was added at an initial rate of 50 grams of NH₃/minute until in approximately two hours the pH value becomes 6.5. It was possible to filter the precipitate formed in approximately 40 minutes by means of the filter mentioned in Example 1. Thereafter, in accordance with procedure described in Example 1, the product was dried at 60° C., then thermally decomposed for 3 hours at 700° C. to form $U_3O_8$, which was reduced and sintered for 3 hours at 1,500° C., whereupon at $UO_2$ powder of reddish purple color having a cohesion such that it loosened when pressed with a finger tip was obtained.

When this cohesive material was further ground according to the procedure of Example 1, its tapped density became 60%. The particle density of this powder was 99%, and its average particle size was approximately 60 microns. Then, when this powder was finely pulverized to a particle size of 5 microns or less, granulated by an ordinary method, and formed by a pressure of 3 metric tons/square centimetre into a circular cylinder of 7 millimetre diameter and 7 millimetre height, the green compact density was 7.4 grams/cubic centimetre. The pellet which was obtained by sintering the green compact cylinder for 2 hours in a current of hydrogen gas at 1,600° C. had a sintered density of 94%, shrinkage rate of 11.8%, and a dimensional accuracy, in the radial direction, of within ∓1/100 millimetre, and any finish grinding was not necessary.

*Example 3*

20 litres of an aqueous solution containing 4 mols of hydrofluoric acid with respect to one mol of uranyl fluoride having a uranium concentration of 25 grams/litre was placed into 40-litre reactions tank made of polyethylene and provided with an agitator. To the said solution, aqueous ammonia of 14% concentration was added at an initial rate of 50 grams of NH₃/minute for 2 hours until precipitation reaction was completed. The solution was then filtered by means of the filter of Example 1 the filtration being completed in approximately one hour. After drying this ADU in a hot-air drier at 200° C., it was pulverized and then thermally decomposed for 3 hours at 400° C., according to the procedure of Example 1, to form $UO_3$, which was then reduced and sintered for 3 hours at 1,500° C. As a result a cohesive aggregate similar to that in Example 1 was obtained; which, after pulverizing, had a tapped density of 73%.

While we have described details of particular embodiments of our invention, it will, of course, be understood that we do not wish our invention to be limited thereto, since many modifications may be made, and we, therefore, contemplate by the appended claims to cover all such modifications as fall within the true spirit and scope of our invention.

What we claim is:

1. A method of producing uranium dioxide powder of an O/U mol ratio of about 2.00 having homogeneous particles of between about 2 to about 150 microns and a particle density of at least 98% comprising the steps of
    precipitating ammonium diuranate from an aqueous solution of refined uranyl salt of less than 100 grams per liter by the addition aqueous ammonia of a concentration of about 28% or less at a rate of about 200 grams of ammonia per kilogram of said uranium per minute or less so as to obtain a sufficiently quantative uranium precipitation;
    drying and thermally decomposing the precipitate ammonium diuranate at a temperature below 900° C. into material selected from the group consisting of uranium trioxide and triuranium octoxide; and,
    reducing and sintering said material in a current of hydrogen gas at a temperature of between about 1200° C. to about 1750° C.

2. A method as claimed in claim 1 wherein said uranyl salt is uranyl nitrate having a uranium concentration of about 25 grams per liter.

3. A method as claimed in claim 1 wherein said uranyl salt is uranyl nitrate having a uranium concentration of about 50 grams per liter.

4. A method as claimed in claim 1 wherein said uranyl salt is uranyl fluoride having a uranium concentration of about 25 grams per liter.

References Cited by the Examiner

UNITED STATES PATENTS

| | | | |
|---|---|---|---|
| 2,906,598 | 9/1959 | Googen | 23—14.5 |
| 2,953,430 | 9/1960 | Leaders | 23—14.5 |

OTHER REFERENCES

CRCE 716 (Part 1), pages 3, 4, 5 and 6–20, Appendix II, Tables I and II, September 1958.

Martin et al., "Chem. Processing Eengineering," vol. 41, No. 7, pages 291–294, 303, July 1960.

Proceedings of the Second United Nations Conference on Peaceful Uses of Atomic Energy: Vol. 4, Pedregal, pages 85–87. Vol. 6, Belle, pages 569–573. Vol. 6, Chalder et al., pages 590–593, 598, 599, September 1958.

TID 7546 (Book 2), pages 374, 390–400, 447, March 1958.

BENJAMIN R. PADGETT, *Acting Primary Examiner.*

CARL D. QUARFORTH, REUBEN EPSTEIN,
*Examiners.*

R. L. GOLDBERG, J. D. VOIGHT, A. G. BOWEN, S. TRAUB, *Assistant Examiners.*